Patented Feb. 2, 1926.

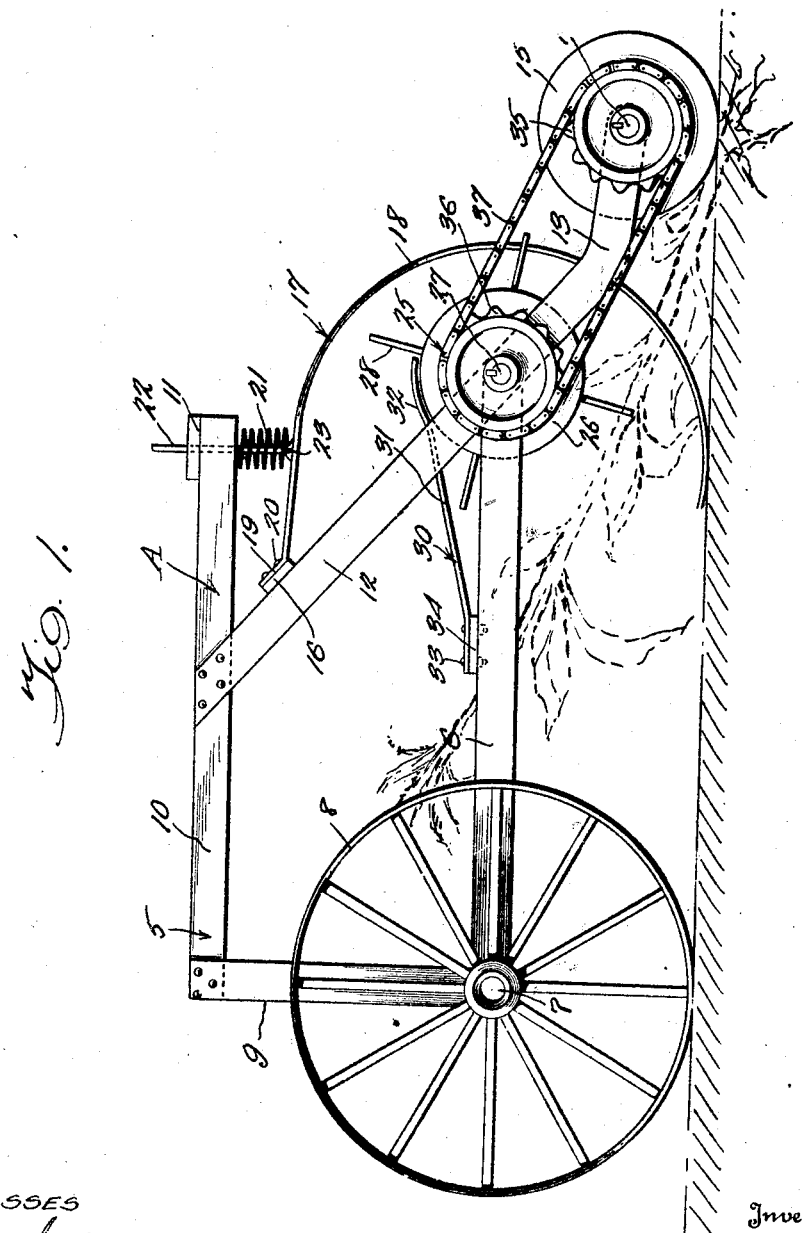

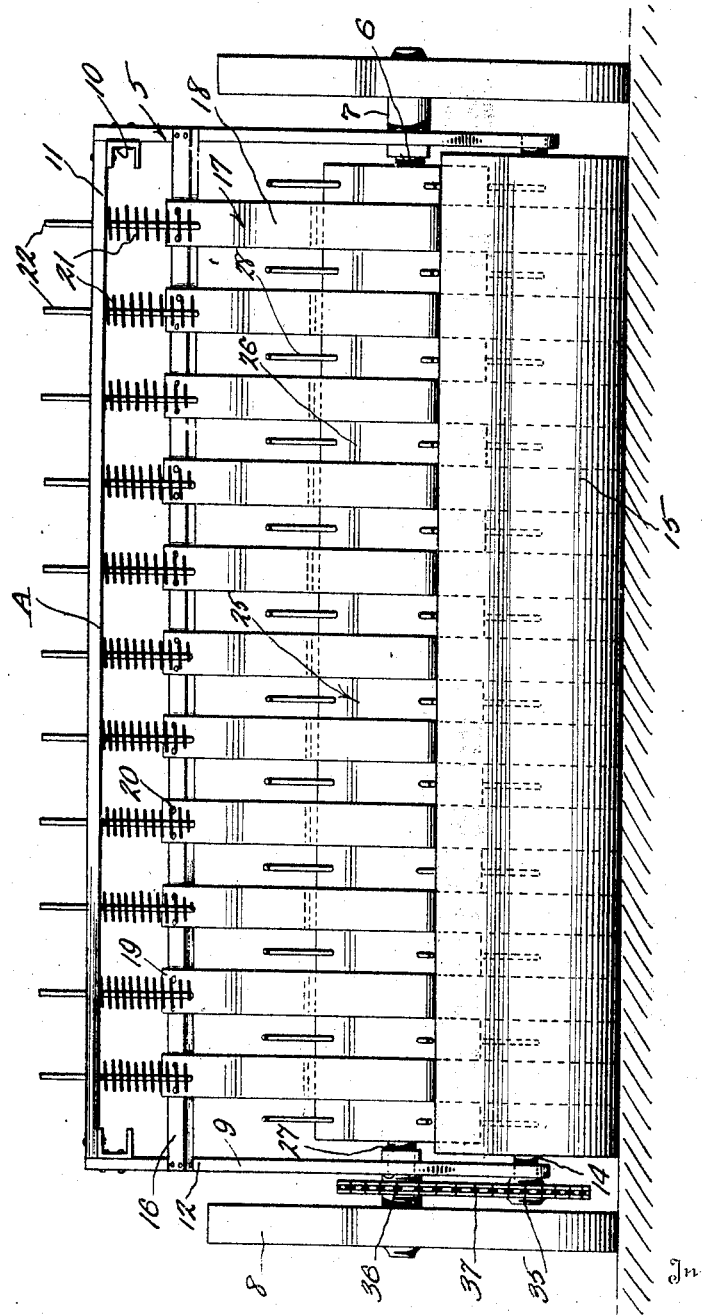

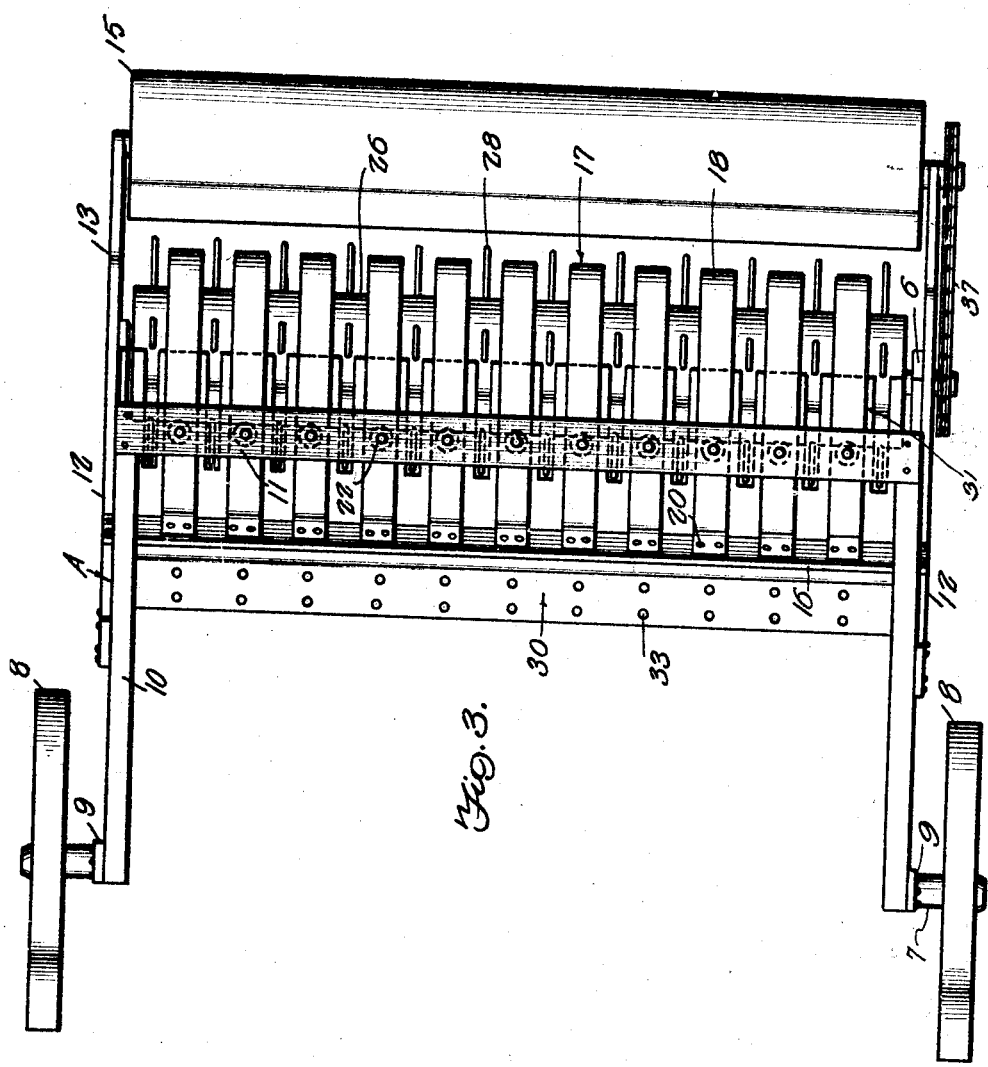

1,571,388

UNITED STATES PATENT OFFICE.

SAMUEL A. WALTER, OF COURTLAND, KANSAS.

CORN-PICKING MACHINE.

Application filed September 17, 1923. Serial No. 663,223.

*To all whom it may concern:*

Be it known that I, SAMUEL A. WALTER, a citizen of the United States, residing at Courtland, in the county of Republic and State of Kansas, have invented certain new and useful Improvements in a Corn-Picking Machine, of which the following is a specification.

This invention appertains to harvesting machinery and the primary object of the invention is to provide a novel machine for traversing a field for stripping the ears of corn from growing corn stalks and for delivering the ears of corn to a suitable receiving platform or the like.

Another prime object of the invention is to provide a corn harvesting machine comprising a novel member for breaking down the corn stalks and novel means for engaging the stalks for stripping the ears of corn therefrom.

A further object of the invention is to provide novel means for mounting the means for stripping the ears of corn from the corn stalks on the frame of the machine, said means including an expansion spring for normally holding the corn stalk stripping means in resilient contact with the ground over which the machine is traveling.

A further object of the invention is the provision of a rotatable toothed drum for picking up the ears of corn stripped from the corn stalks by the stripping device and for delivering the same to a suitable receiving platform or the like.

A still further object of the invention is to provide an improved corn harvesting machine of the above character which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved corn harvester,

Figure 2 is a rear elevation of the same, and

Fig. 3 is a top plan view of the harvester.

Referring to the drawings in detail, wherein similar reference characters designate corresponding parts throughout the several views, the letter A generally indicates the improved corn harvesting machine, which comprises the supporting frame 5.

The supporting frame 5 can be made of any desired material and consists of the longitudinally extending side bars 6, which support the outwardly extending stub axles 7, on which are rotatably mounted the ground engaging supporting wheels 8. The forward ends of the longitudinally extending side bars 6 support upstanding posts or standards 9, which in turn have rigidly attached thereto the rearwardly extending upper longitudinally extending side bars 10. The rear terminals of the side bars 10 end short of the rear terminals of the longitudinally extending side bars 6. The rear ends of the bars 10 are connected together by a transverse cross bar 11. The frame 5 can be braced in any other desired way, and as shown depending rearwardly inclined supporting bars 12 are connected to the terminals of the longitudinally extending side bars 6 and to the upper side bars 10 at a point intermediate their ends. These depending rearwardly inclined bars 12 extend below and rearwardly of the side bars 6 and the lower ends of the bars 12 terminate in angularly extending arms 13 which rotatably support a transverse shaft 14 on which is secured in any preferred way, a relatively heavy roller 15 for bending over the corn stalks. This roller 15 engages the ground, as clearly shown in Figure 1 of the drawings.

The depending rearwardly inclined bars 12 have rigidly connected thereto a transverse supporting bar 16 directly below the side bars 10 and this bar 16 resiliently supports the corn stalk stripping means 17, which will be now described.

The corn stalk stripping means 17 comprises a plurality of resilient equidistantly spaced tines 18, which are of a substantially semicircular shape in edge elevation. The upper terminals of these tines 18 terminate in attaching feet 19, which are riveted or otherwise secured as at 20 to the bar 16. The lower terminals of the tines 18 engage the surface of the ground over which the machine travels and it is to be noted that owing to the curvature of the tines the catching thereof in the ground is obviated. In order to normally maintain the tines in engagement with the ground and to permit a limited swinging movement thereof in relation to the ground to compensate for the uneven surface thereof, an expansion spring 21 is provided for each tine. Each expansion spring 21 is coiled about a supporting rod 22, which is slidably extended through the transverse cross bar 11. The lower terminal of each rod 22 is pivotally connected as at 23 to its respective tines.

Now it is obvious that as the machine is pulled over the ground that the roller 15 will effectively break down the corn stalks while the tines 18 will engage the same and effectively strip the ears of corn therefrom.

In order to effect the picking up of the ears, from the tines 18 after the ears have been stripped from the corn stalks, a novel picking device 25 is provided.

This picking device 25 consists of a drum 26, secured in any preferred manner to the transverse shaft 27, rotatably mounted in suitable bearings carried by the rear terminals of the side bars 6. The periphery of the drum 26 is provided with a plurality of equidistantly spaced rows of teeth 28 which are adapted to project between the tines 18 during the operation of the drum 26. These rows of teeth 28 are adapted to pick up the ears of corn after the same have been stripped from the stalks and elevated onto a suitable platform or the like 30. This platform 30 as shown consists of a plurality of equidistantly spaced arms 31, the rear terminals of which are arcuate shape to engage over the periphery of the drum 26. The forward terminals of the arms 31 are riveted or otherwise connected as at 33 to a cross bar 34, which is in turn secured to the side bars 6.

In order to bring about the rotation of the drum 35 during the movement of the machine over a field, the shaft 14 of the roller 15 is provided with a sprocket wheel 35, which is in alignment with a sprocket wheel 36 secured to the shaft 27 on the drum 26 and these sprocket wheels 35 and 36 have trained about the same a suitable drive sprocket chain 37.

Any preferred type of draft appliance can be attached to the forward end of the machine 9, or the machine can be attached to a tractor, or other piece of farm machinery. If so desired, an endless conveyor can be employed for taking the ears of corn away from the platform 30 or a husking attachment can be carried directly by the machine in front of the platform 30.

Changes in details may be made without departing from the spirit or the scope of this invention.

What I claim as new is:

1. In a machine for picking ears of corn from growing corn stalks, a wheeled frame, a ground roller carried by the frame for breaking down the cornstalks, a stripper carried by the frame in front of the roller including a plurality of spaced resilient tines extending longitudinally of the frame for engaging and pulling the ears of corn from the stalks, and means for normally urging the tines in engagement with the ground.

2. In a means for picking ears of corn from growing corn, a wheeled frame, a ground roller carried by and disposed in rear of the frame for breaking down the stalks of corn, a stripper carried by the frame disposed in front of the roller including a plurality of spaced resilient arcuate tines extending longitudinally of the frame for engaging and stripping the ears of corn from the stalks, resilient means for normally urging each tine in engagement with the ground, and means including a rotatable toothed drum for receiving and elevating the ears of corn from said tines.

3. In a means for picking ears of corn from growing corn, a wheeled frame, a roller carried by and disposed in rear of the frame for breaking down the stalks of corn, a stripper carried by the frame disposed in front of the roller including a plurality of resilient arcuate spaced tines for engaging and stripping the ears of corn from the stalks, resilient means for normally urging each tine toward the ground, means including a rotatable toothed drum for receiving and elevating the ears of corn from said tines, and means for rotating said toothed drum from the roller.

4. In a machine for stripping ears of corn from growing corn stalks, a wheeled frame including lower longitudinal side bars, upper side bars, depending rearwardly inclined supporting arms connected to the upper and lower side bars, a roller carried by the rear terminals of the arms for engaging the ground and the corn stalks for breaking down the stalks, a toothed drum carried by the side bars and arms, means for rotating the drum, a plurality of equidistantly spaced arcuate tines associated with the frame and arranged between the toothed drum and the roller, and a platform carried by the lower side bars for receiving the ears of corn from the toothed drum including a plurality of arms arranged to extend between the teeth of the drum.

In testimony whereof I affix my signature.

SAMUEL A. WALTER.